(12) United States Patent
Farmanbar et al.

(10) Patent No.: US 10,771,325 B2
(45) Date of Patent: Sep. 8, 2020

(54) SYSTEM AND METHOD FOR ACCESS NETWORK CONFIGURATION

(71) Applicants: Hamidreza Farmanbar, Ottawa (CA); Nimal Gamini Senarath, Ottawa (CA); William Anthony Gage, Stittsville (CA)

(72) Inventors: Hamidreza Farmanbar, Ottawa (CA); Nimal Gamini Senarath, Ottawa (CA); William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 15/861,177

(22) Filed: Jan. 3, 2018

(65) Prior Publication Data
US 2018/0191563 A1 Jul. 5, 2018

Related U.S. Application Data

(60) Provisional application No. 62/442,792, filed on Jan. 5, 2017.

(51) Int. Cl.
| | | |
|---|---|---|
| H04W 48/18 | (2009.01) | |
| H04L 12/24 | (2006.01) | |
| H04W 76/10 | (2018.01) | |

(52) U.S. Cl.
CPC ...... *H04L 41/0803* (2013.01); *H04L 41/0816* (2013.01); *H04L 41/0843* (2013.01); *H04W 48/18* (2013.01); *H04L 41/085* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2017/0070892 A1* | 3/2017 | Song | H04L 41/042 |
| 2017/0208019 A1* | 7/2017 | Shimojou | H04L 41/5054 |

FOREIGN PATENT DOCUMENTS

| | | | |
|---|---|---|---|
| CN | 106060900 A | 10/2016 | |
| WO | 2016101670 A1 | 6/2016 | |
| WO | WO-2017193553 A1 * | 11/2017 | H04W 76/10 |

OTHER PUBLICATIONS

3GPP TR 28.801 V0.3.0, 3rd Generation Partnership Project; Technical Specification Group Services and System Aspects; Telecommunication management; Study on management and orchestration of network slicing for next generation network (Release 14), Nov. 30, 2016.

(Continued)

*Primary Examiner* — Sargon N Nano
*Assistant Examiner* — Christopher B Robinson

(57) ABSTRACT

Methods for configuring user plane functions associated with a network slice. The methods include: creating a user plane configuration profile specific to at least one of an access technology and a user plane function; associating the user plane configuration profile with a network slice instance; selecting the network slice in response to a service request; and communicating the user plane configuration profile associated with the selected network slice instance to a control plane function.

8 Claims, 8 Drawing Sheets

(56) References Cited

OTHER PUBLICATIONS

3GPP TS 24.302 V12.8.0, 3rd Generation Partnership Project; Technical Specification Group Core Network and Terminals; Access to the 3GPP Evolved Packet Core (EPC) via non-3GPP access networks; Stage 3 (Release 12), Mar. 31, 2015.
3GPP TSG-RAN WG3, Meeting #93bis, R3-162401,"Definition for RAN support of slicing", Nokia, Alcatel-Lucent Shanghai Bell, Oct. 14, 2016.
3GPP TSG SA WG3 Security—S3#54bis, S3-090425, "Clarification of order for identity request and AVs fetching", Ericsson, Change Request 33.402 CR 0053 Current version:8.3.1, Mar. 26 2009.
International Search Report dated Mar. 30, 2018 for corresponding International application No. PCT/CN2018/071460 filed Jan. 4, 2018.

* cited by examiner

SYSTEM AND METHOD FOR ACCESS NETWORK CONFIGURATION

CROSS-REFERENCE TO RELATED APPLICATIONS

This application is based on, and claims benefit of, U.S. provisional application No. 62/442,792 filed Jan. 5, 2017, the entire contents of which are hereby incorporated herein by reference.

FIELD OF THE INVENTION

The present invention pertains to the field of communication networks, and in particular to systems and methods for network configuration.

BACKGROUND

The architecture of a Long Term Evolution (LTE) mobile network, and the corresponding Evolved Packet Core (EPC), was not initially designed to take into account the handling of traffic for different types of services through different types of access networks. Multiple data streams requiring different treatment when being sent between a User Equipment (UE) and a network access point such as an eNodeB (eNB), can be supported by configuration of one or more levels within the LTE air interface user plane (UP) stack, which consists of Packet Data Convergence Protocol (PDCP), Radio Link Control (RLC) and Medium Access Control (MAC) layers. Additionally, support for prioritization of logical channels such as the Data Radio Bearer (DRB), also referred to as Logical Channel Prioritization (LCP), is somewhat limited in its flexibility. The LTE air interface defines a fixed numerology that was designed to provide a best result for a scenario that was deemed to be representative of an expected average usage scenario. The ability of a network to support multiple network slices with respective to the differentiated treatment of traffic and the support of customised Service Level Agreements (SLAs) would allow greater flexibility. In fifth generation (5G) networks, Core Network (CN) expands the capabilities of the EPC through the use of network slicing to concurrently handle traffic received through or destined for multiple access networks where each access network (AN) may support one or more access technologies (ATs).

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods for configuring user plane resources of a communications network.

Accordingly, an aspect of the present invention provides a control plane entity of an access network connected to a core network, the control plane entity being configured to: store at least one AN configuration profile, the AN configuration profile including parameters defining a respective configuration of access network resources selected to satisfy performance requirements of a corresponding network slice; receive, from a core network control plane function, an identification of a selected AN configuration profile; and establish a connection between a User Equipment and the core network using the AN configuration profile. In some embodiments, AN configuration profile may simply be an identification an AN configuration profile, and not the identification of a selected AN. In some embodiments, an access network control plane function may receive information from a core network control plane function that may assist in selecting a configuration profile.

A further aspect of the present invention provides a control plane entity of a core network connected to an access network, the control plane entity configured to: store information identifying, for each one of at least two network slices, a respective AN configuration profile of the access network (which may be identified in accordance with information from a core network control plane function as described above); select, responsive to a service request associated with one network slice, the information identifying at least one of the AN configuration profiles; and forwarding, to an access network control plane function, the information identifying at least one of the AN configuration profiles.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
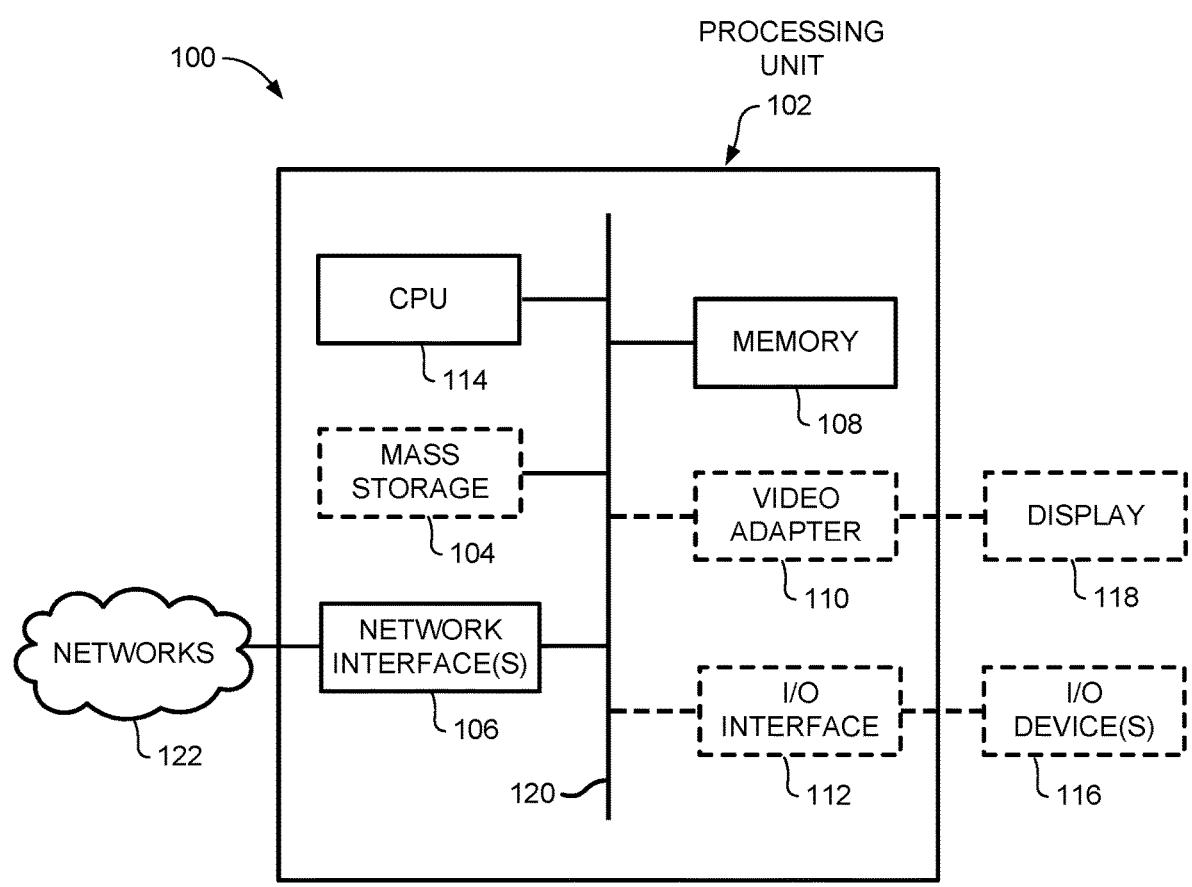
FIG. 1 is a block diagram of a computing system that may be used for implementing devices and methods in accordance with representative embodiments of the present invention.

FIG. 1 is a block diagram of a computing system 100 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. The processing unit 102 typically includes a central processing unit (CPU) 114, a bus 120 and a memory 108, and may optionally also include elements such as a mass storage device 104, a video adapter 110, and an I/O interface 112 (shown in dashed lines).

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. In an embodiment, the memory 108 may include ROM for use at boot-up, and DRAM for program and data storage for use while executing programs. The bus 120 may be one or more of any type of several bus architectures including a memory bus or memory controller, a peripheral bus, or a video bus.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, or an optical disk drive.

The video adapter 110 and the I/O interface 112 provide optional interfaces to couple external input and output devices to the processing unit 102. Examples of input and output devices include a display 118 coupled to the video adapter 110 and an I/O device 116 such as a touch-screen coupled to the I/O interface 112. Other devices may be coupled to the processing unit 102, and additional or fewer interfaces may be utilized. For example, a serial interface such as Universal Serial Bus (USB) (not shown) may be used to provide an interface for an external device.

The processing unit 102 may also include one or more network interfaces 106, which may comprise wired links, such as an Ethernet cable, and/or wireless links to access one or more networks 122. The network interfaces 106 allow the processing unit 102 to communicate with remote entities via the networks 122. For example, the network interfaces 106 may provide wireless communication via one or more transmitters/transmit antennas and one or more receivers/receive antennas. In an embodiment, the processing unit 102 is coupled to a local-area network or a wide-area network for data processing and communications with remote devices, such as other processing units, the Internet, or remote storage facilities.

Figure 2:
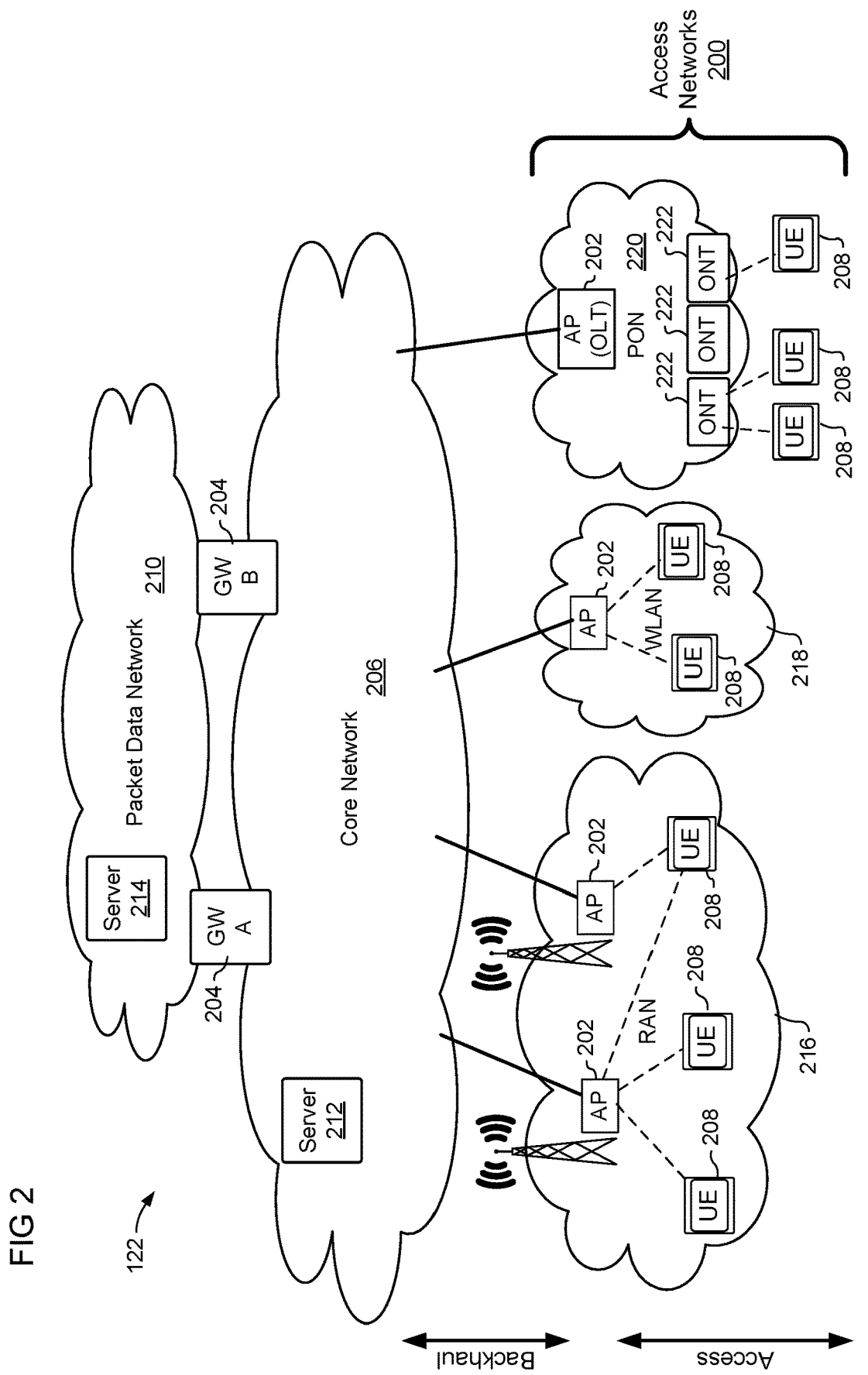
FIG. 2 is a block diagram schematically illustrating an architecture of a representative network in which embodiments of the present invention may be deployed.

FIG. 2 is a block diagram schematically illustrating an architecture of a representative network in which embodiments of the present invention may be deployed. The network 280, may be a Public Land Mobile Network (PLMN) comprising an Access Network 200 and a core network 206 through which UEs may access a packet data network 210. PLMN 280 may be configured to provide connectivity between User Equipment (UE) 208 such as mobile communication devices, and services instantiated by one or more servers such as server 212 in the core network 206 and server 214 in the packet data network 210 respectively. Thus, network 280 may enable end-to-end communications services. As may be seen in FIG. 2, the AN 200 may comprise any number of Local Area Networks (LANs) and Wide Area Networks (WANs), each of which may implement one or more access technologies (ATs) and operate in accordance with one or more communications protocols. Example access technologies that may be implemented include Radio Access Technologies (RATs) such as, Long Term Evolution (LTE), High Speed Packet Access (HSPA), Global System for Mobile communication (GSM), Enhanced Data rates for GSM Evolution (EDGE), 802.11 WiFi, 802.16 WiMAX, Bluetooth and RATs based on 5G New Radio (NR) technologies; and wireline access technologies such as Ethernet. By way of example only, the Access Network 200 of FIG. 2 includes a wide area Radio Access Network (RAN) 216 that may implement multiple different RATs; a WiFi local area network (WLAN) 218; and a Passive Optical Network (PON) 220. In each of these access networks, one or more Access Points (APs) 202 may be connected to at least one Packet Data Network Gateway (GW) 204 through the core network 206.

In the LTE standards, as defined by the Third Generation Partnership Project (3GPP), an AP 202 may also be referred to as an evolved Node-B (eNodeB, or eNB), while in the context of discussion of a next generation (e.g. 5G) communications standard, an AP may also be referred to by other terms such as a gNB. In a Passive Optical Network (PON), the AP is normally provided by an Optical Line Terminal (OLT). In a WiFi based wireless network the AP may be a WiFi Access Point as defined by the relevant IEEE 802.11 standards. In this disclosure, the terms Access Point (AP), evolved Node-B (eNB), eNodeB and gNB will be treated as being synonymous, and may be used interchangeably. In an Evolved Packet Core (EPC) network, the gateway 204 may be a packet gateway (PGW), and in some embodiments one of the gateways 204 could be a serving gateway (SGW). In a 5G CN, one of the gateways 204 may be a user plane gateway (UPGW).

In an access network implementing a RAT, the APs 202 typically include radio transceiver equipment for establishing and maintaining wireless connections with the UEs 208, and one or more interfaces for transmitting data or signalling to the core network 206. Some traffic may be directed through CN 206 to one of the GWs 204 so that it can be transmitted to a node within PDN 210. In an access network implementing a wired access technology, the APs typically include one or more physical ports for connecting to electrical or optical communications infrastructure for maintaining wired connections with the UEs 208. For example, in the PON 220 illustrated in FIG. 2, the AP (OLT) 202 is connected by optical fiber links (not shown) to a plurality of Optical Network Terminals (ONTs) 222, each of which may be connected to one or more UEs 208 via wired or wireless links.

Each GW 204 provides a link between the core network 206 and the packet data network 210, and so enables traffic flows between the packet data network 210 and UEs 208. It is common to refer to the links between the APs 202 and the core network 206 as the "backhaul" network which may be composed of both wired and wireless links.

Typically, traffic flows to and from UEs 208 are associated with specific services of the packet data network 210 and/or the core network 206. As is known in the art, a service of the packet data network 210 will typically involve either one or both of a downlink traffic flow from one or more servers 214 in the packet data network 210 to a UE 208 via one or more of the GWs 204, and an uplink traffic flow from the UE 208 to one or more of the servers in the packet data network 210, via one or more of the GWs 204. Similarly, a service of the core network 206 will involve either one or more of a downlink traffic flow from one or more servers 212 of the wired network 206 to a UE 208, and an uplink traffic flow from the UE 208 to one or more the servers 212. In both cases, uplink and downlink traffic flows are conveyed through a data bearer between the UE 208 and one or more host APs 202. The resultant traffic flows can be transmitted, possibly with the use of encapsulation headers (or through the use of a logical link such as a core bearer) through the core network 206 from the host APs 202 to the involved GWs 204 or servers 212 of the core network 206. An uplink or downlink traffic flow may also be conveyed through one or more user plane functions (UPFs) 230 in the core network 206.

In wide area wireless access networks, the data bearer comprises a radio link between the UE 208 and its host AP(s) 202, and is commonly referred to as a Data Radio Bearer (DRB). For convenience of the present description, the term Data Radio Bearer (DRB) shall be used herein to refer to the logical link(s) between a UE and its host AP(s) 202, regardless of the actual access technology implemented by the access network in question. In Evolved Packet Core (EPC) networks, the core bearer is commonly referred to as an EPC bearer. In a 5G core network architecture, a Protocol Data Unit (PDU) session may be used to encapsulate functionality similar to an EPC bearer. Accordingly, the term "core bearer" will be used in this disclosure to describe the connection(s) set up through the core network to support traffic flows between APs 202 and GWs 204 or servers 212. A network slice instance (NSI) can be associated with a network service (based on its target subscribers, bandwidth, Quality of Service (QoS) and latency requirements, for example) and one or more PDU sessions can be established within the NSI to convey traffic associated with that service through the NSI using the appropriate core bearer. In a core network 206 that supports network slicing, one or more core bearers can be established in each NSI.

Figure 3:
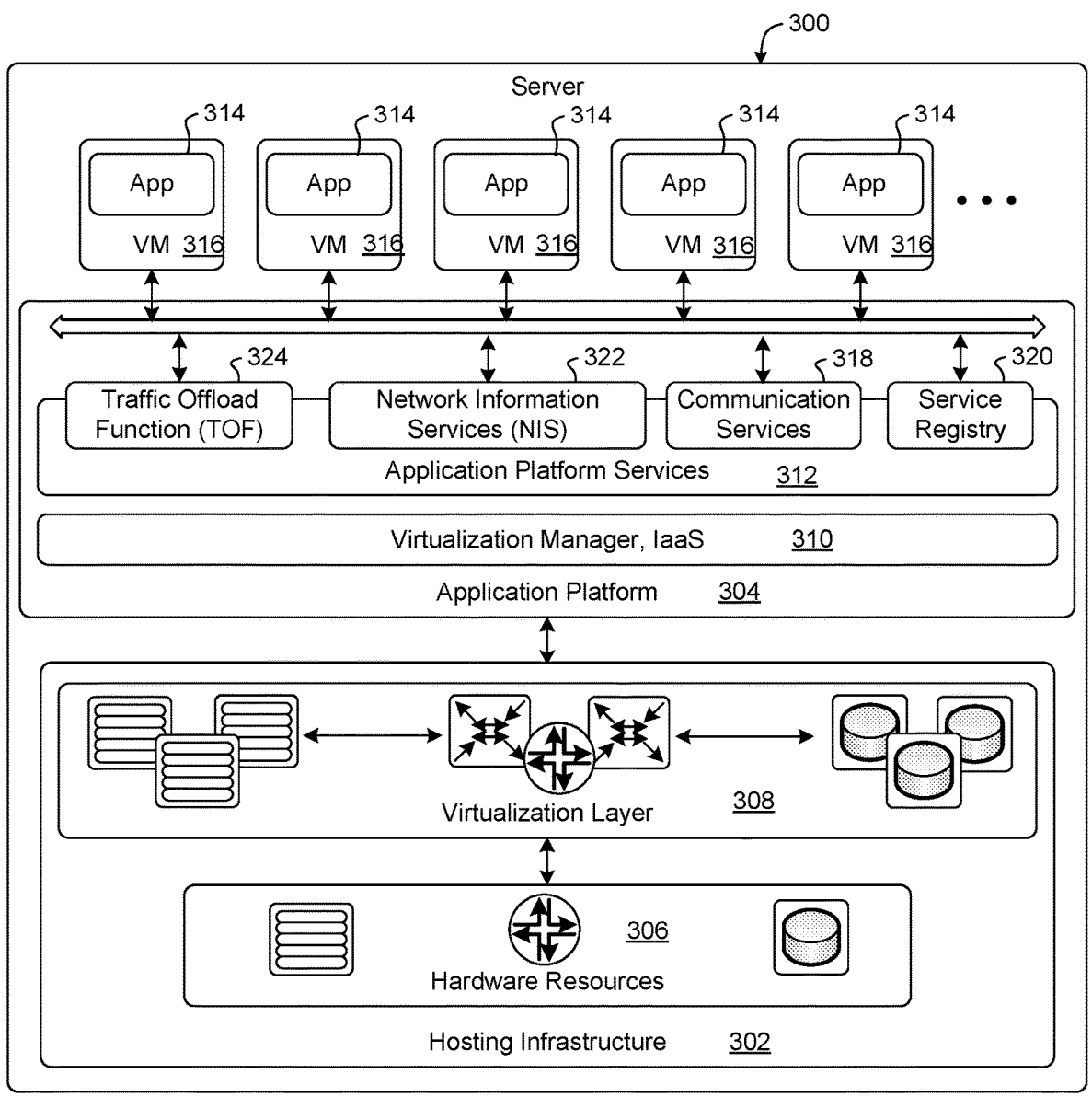
FIG. 3 is a block diagram schematically illustrating an architecture of a representative server usable in embodiments of the present invention.

FIG. 3 is a block diagram schematically illustrating an architecture of a representative server 300 usable in embodiments of the present invention. It is contemplated that any or all of the APs 202, gateways 204 and servers 212, 214 of FIG. 2 may be implemented using the server architecture illustrated in FIG. 3. It is further contemplated that the server 300 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 3 shows a representative functional architecture of a server 300, it being understood that this functional architecture may be implemented using any suitable combination of hardware and software.

As may be seen in FIG. 3, the illustrated server 300 generally comprises a hosting infrastructure 302 and an application platform 304. The hosting infrastructure 302 comprises the physical hardware resources 306 (such as, for example, information processing, traffic forwarding and data storage resources) of the server 300, and a virtualization layer 308 that presents an abstraction of the hardware resources 306 to the Application Platform 304. The specific details of this abstraction will depend on the requirements of the applications being hosted by the Application layer (described below). Thus, for example, an application that provides traffic forwarding functions may be presented with an abstraction of the hardware resources 306 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 304 provides the capabilities for hosting applications and includes a virtualization manager 310 and application platform services 312. The virtualization manager 310 supports a flexible and efficient multi-tenancy run-time and hosting environment for applications 314 by providing Infrastructure as a Service (IaaS) facilities. In operation, the virtualization manager 310 may provide a security and resource "sandbox" for each application being hosted by the platform 304. Each "sandbox" may be implemented as a Virtual Machine (VM) image 316 that may include an appropriate operating system and controlled access to (virtualized) hardware resources 306 of the server 300. The application-platform services 312 provide a set of middleware application services and infrastructure services to the applications 314 hosted on the application platform 304, as will be described in greater detail below.

Applications 314 from vendors, service providers, and third-parties may be deployed and executed within a respective Virtual Machine 316. For example, Network Functions Virtualization (NFV) Management and Organization (MANO) and Service-Oriented Virtual Network Auto-Creation (SONAC) and its various functions such as Software Defined Topology (SDT), Software Defined Protocol (SDP), and Software Defined Resource Allocation (SDRA) may be implemented by means of one or more applications 314 hosted on the application platform 404 as described above. Communication between applications 314 and services in the server 400 may conveniently be designed according to the principles of Service-Oriented Architecture (SOA) known in the art. Those skilled in the art will appreciate that in place of virtual machines, virtualization containers may be employed to reduce the overhead associated with the instantiation of the VM. Containers and other such network virtualization techniques and tools can be employed along with other such variations as would be required if a VM is not instantiated.

Communication services 318 may allow applications 314 hosted on a single server 300 to communicate with the application-platform services 312 (through pre-defined Application Programming Interfaces (APIs) for example) and with each other (for example through a service-specific API).

A Service registry 320 may provide visibility of the services available on the server 200. In addition, the service registry 320 may present service availability (e.g. status of the service) together with the related interfaces and versions. This may be used by applications 414 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 322 may provide applications 314 with low-level network information. For example, the information provided by MS 322 may be used by an application 314 to calculate and present high-level and meaningful data such as: cell-ID, location of the subscriber, cell load and throughput guidance.

A Traffic Off-Load Function (TOF) service 324 may prioritize traffic, and route selected, policy-based, user-data streams to and from applications 214. The TOF service 3424 may be supplied to applications 314 in various ways, including: A Pass-through mode where (uplink and/or downlink) traffic is passed to an application 314 which can monitor, modify or shape it and then send it back to the original Packet Data Network (PDN) connection (e.g. 3GPP bearer);

and an End-point mode where the traffic is terminated by the application 314 which acts as a server.

As is known in the art, conventional access networks, including LTE, were not designed to support network slicing. While much attention has been directed to the use of network slicing in the core network, slicing of a Radio Access Network, such as RAN 216 or WLAN 218, has drawn less immediate attention. Support for network slicing in an access network requires configuration that is specific to each of the access technologies implemented by the AN. Similarly, support for network slicing in a core network 206 may require configuration that is specific to each of the UPFs 230 deployed in the CN.

Embodiments of the present invention provide techniques for supporting network slicing in the user plane of core and access networks in a manner that hides (or reduces the visibility of) the specific AT and UPF configurations from the CN control plane (CP). This reduction in the need for the CN CP to be aware of the access network specific configurations can allow for a CN control plane that is agnostic with respect to the technologies (e.g. access technologies) deployed in the user plane. In accordance with embodiments the present invention, a plurality of different AT and UPF configurations can be established and maintained by a configuration management function (CMF). The CMF can also store information identifying each user plane configuration that can be transmitted to a core network control plane function (CN CPF) and to an access network control plane function (AN CPF) associated with each of the ANs. The CN CPF can then associate each user plane configuration with a respective network slice. When a new service instance is requested, the CN CPF can identify the appropriate network slice for the service instance in a conventional manner, and provide both the service parameters and the appropriate AN configuration for the service to the AN CPF. Based on this information, the AN CPF can configure the appropriate access technology (AT) to handle traffic associated with the service. Similarly, the CN CPF can provide the appropriate UPF configuration to each of the CN UPFs provided to handle traffic associated with the service. This arrangement can allow for the respective parameters defining each user plane configuration to be established and updated as needed by the CMF without changing the information held by the CN CPF. Consequently, the techniques disclosed herein can be agnostic to the specific user plane technologies implemented by any given access network 200 and core network 206 (and by the technologies implemented by nodes therein), and can support vendor specific configurations in the access network 200 and core network 206.

As may be appreciated, the AN CPF may be implemented by way of one or more applications executing on the AP(s) 202 of an access network 200, or a centralised server (not shown) associated with the access network 200. In some embodiments, the AP may be implemented as a set of network functions instantiated upon computing resources within a data center, and provided with links to the physical transmit resources (e.g. antennae). The AN CPF may be implemented as a virtual function instantiated upon the same data center resources as the AP or another such network entity. Similarly, the CN CPF may be implemented by way of one or more applications executing on the GW(s) 204 of the core network 206, or a centralised server (for example server 212) of the core network 206. It will be appreciated that for this purpose the AP(s) 202 and/or centralized servers may be configured as described above with reference to FIG. 3. Similarly, the CMF may be implemented by way of one or more applications executing on the AP(s) 202 of an access network 200, or a centralised server (not shown) associated with the access network 200 or with the core network 206.

Figure 4:
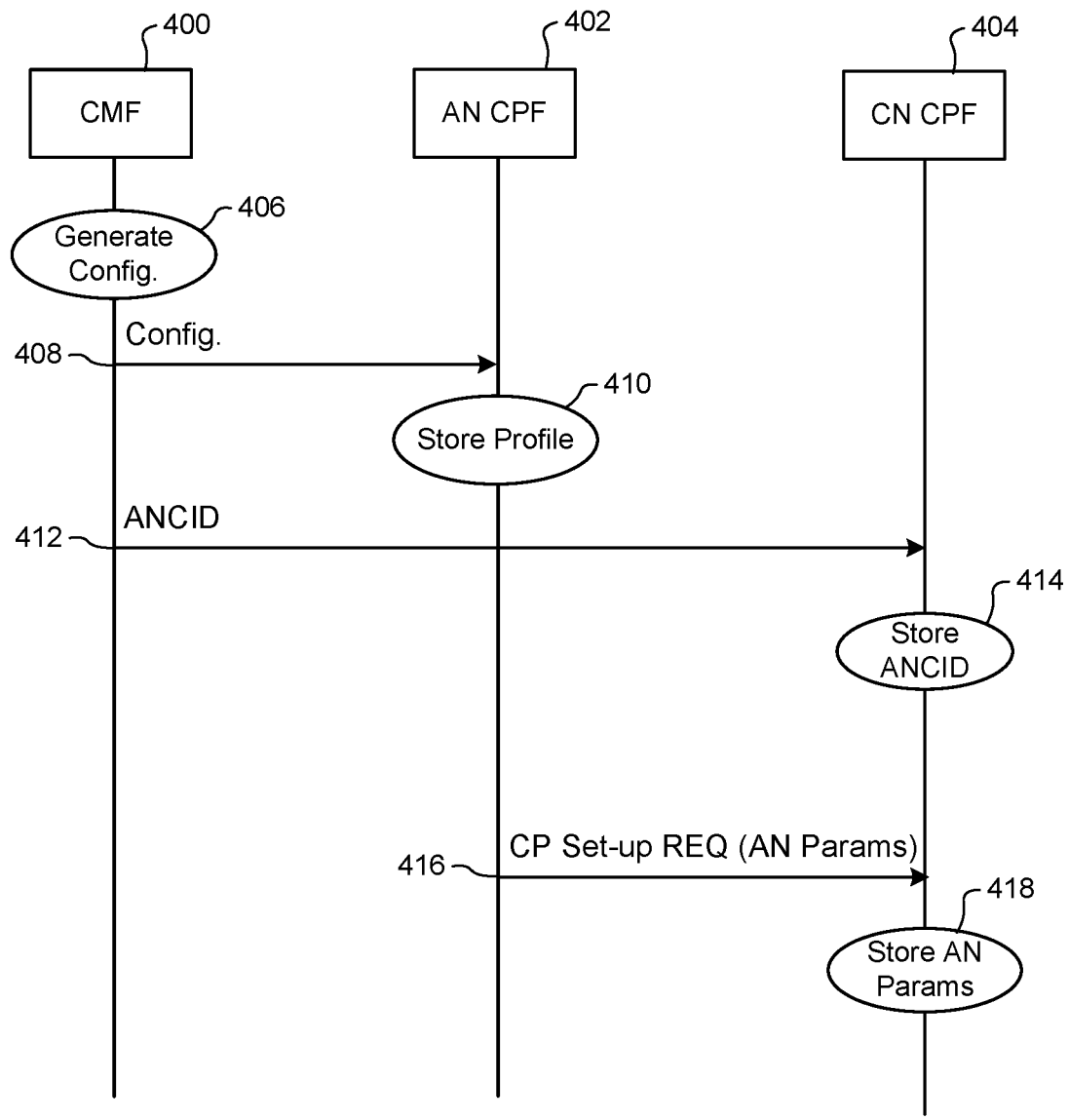
FIG. 4 illustrates an example message flow in accordance with an embodiment of the present invention.

FIG. 4 illustrates an example message flow between the CMF 400, AN CPF 402 and CN CPF 404 in accordance with an embodiment of the present invention. The process of FIG. 4 starts with the CMF 400 generating (at 406) parameters defining one or more AT and UPF configurations for transporting data between a UE 208 and the core network 206. The AT-specific configuration parameters are then supplied to the AN CPF 402 (at 408), which saves (at 410) an AN profile including an AN Configuration IDentifier (ANCID) and the configuration parameters. The ANCID may also be supplied (at 412) to the CN CPF 404, which may store (at 414) the ANCID along with NSI configuration information, as will be described in greater detail below. The CMF 400 may generate the AN profile in response to any predetermined event, such as, for example, a start-up of the AN CPF 402, a change in one or more characteristics of the AN, or a request (not shown) from either the AN CPF 402 or the CN CPF 404. In the case of a request from either the AN CPF 402 or the CN CPF 404, the request message may include information identifying a network slice and/or performance requirements (such as QoS, latency, etc) of that network slice. Similarly, the CMF 400 may provide the CN CPF 404 with a UPF Configuration IDentifier (UPFCID) associated with one or more of the CN UPFs. It will be understood that the ANCID could be replaced with other information that would allow for the identification of an AN configuration profile.

Figure 5:
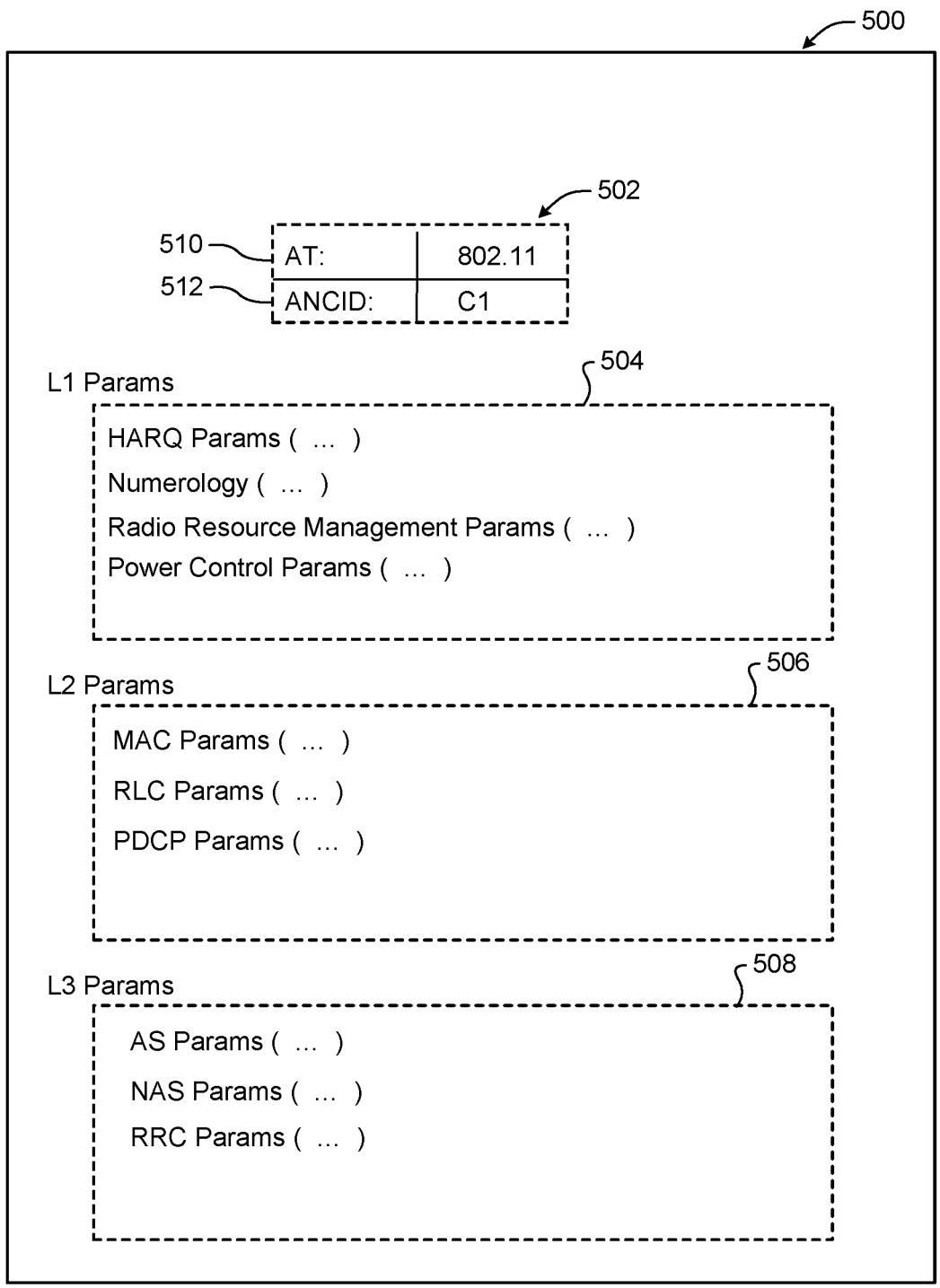
FIG. 5 illustrates an example configuration profile in accordance with an embodiment of the present invention.

FIG. 5 illustrates an example AN profile 500 which includes a header block 502 and a plurality of parameters, which in the example of FIG. 5 are grouped according to the layer of the network protocol stack to which the parameters apply. Accordingly, the AN profile includes L1 parameters 504, L2 parameters 506 and L3 parameters 508. It will be appreciated that the AN profile may have any desired format, which may be specific to any one or more of the AN, AT or vendor, and parameters may be grouped in any convenient manner, or not at all.

In the example of FIG. 5, the header block 502 includes the Access Technology (AT) 510 implemented by the AN, and the AN Configuration ID (ANCID) 512 that identifies the particular AN configuration defined by the AN profile 500.

L1 parameters 504 may include parameters related to Layer 1 (PHY) functions of the AN, including, for example, numerology, radio resource management and power control.

As is known in the art, the numerology comprises a set of parameters defining the Layer 1 characteristics of the transmission of one or more data packets or packet fragments. This set of parameters may identify any one or more of a Transmission Time Interval (TTI), a Forward Error Correction (FEC) scheme, a Modulation Coding Scheme (MCS), and parameters of the transmission waveform (such as, for example, Frequency Division Multiplexing (FDM), Orthogonal Frequency Division Multiplexing (OFDM), filtered OFDM (f-OFDM), Sparse Code Multiple Access (SCMA), Non Orthogonal Multiple Access (NOMA), spread spectrum encoding, carrier frequency, etc.).

Radio resource management (RRM) parameters can be varied so that they supplement the numerology to allow control of specific resources to be used for a given network slice. For example, in a wireless AN with hard slicing, parameters may be defined for controlling the scheduler to use predetermined radio resources (such as TTI and frequency, for example) for a given slice. Alternatively, in the case of a wireless AN with soft slicing, parameters defining thresholds to be used under different loading states may be specified. In various embodiments, RRM parameters may include any one or more of: a set of Resource Blocks (RBs) within the TTI to be used; Forward Error Correction Code (FEC) or specific MCS, blocked or barred DRBs, and any required pre-coding (such as, for example, a data scrambling scheme) to be applied to transmitted data.

Hybrid Automatic Repeat Request (HARQ) parameters may be used to control the operation of HARQ in a particular slice, such as by limiting the maximum number of times that a receiver can request retransmission of an errored block.

Power control parameters may be used, for example, to limit the maximum and/or minimum radio transmission power levels for a particular slice.

The L2 parameters 506 may include parameters related to Layer 2 functions of the AN including, for example, Layer 2 Control Plane (CP) and User Plane (UP) functions, Media Access Control (MAC) and Admission Control, Radio Link Control (RLC), and Packet Data Convergence Protocol (PDCP). Those skilled in the art will appreciate that in other embodiments, the L2 parameters 506 may include parameters related to Service Data Adaptation Protocol (SDAP).

Layer 2 Control Plane (CP) and User Plane (UP) function control parameters can be used to define AN services or functions for a particular slice. CP function control parameters may be used to define a simplified Layer 2 control plane for a specific slice, for example by excluding certain functions or services of the AN. For example, in a slice optimized for communications between stationary devices, AN functions and services related to device mobility management, hand-off and location tracking are not needed, and so can be excluded. UP function control parameters may be used to customize protocols to the needs of data traffic associated with a specific slice, for example by defining a customized packet segmentation and/or header compression. Fault management parameters may be used to control how errors and faults are handled in the network slice. For example, RLC parameters may be used to indicate whether in-sequence packet delivery is required or to configure various retransmission or link failure timers.

Media Access Control (MAC) and Admission Control parameters may be used, for example, to define packet prioritization or admission rules for a specific slice.

The L3 parameters 508 may include parameters related to Layer 3 functions of the AN, including, for example, Layer 3 Control Plane (CP) and User Plane (UP) functions, Access Stratum (AS), Non-Access Stratum (NAS) functions and Radio Resource Control (RRC) functions. For example, traffic forwarding may be controlled such that traffic associated with one slice follows a different service function path than traffic associated with another slice.

Referring back to FIG. 4, during system initialisation the AN CPF 402 may send a CP set-up request message 416 to the CN CPF 404. Preferably, the CP set-up request message 416 includes AN parameters such as the AN identifier and AN node (AP) identifier. In some embodiments, the access technologies supported by the AN may also be included in the CP set-up request message 416 along with a set of AN attributes and capabilities. Upon receipt of the CP set-up request message 416 from the AN CPF 402, the CN CPF 404 may store (at 418) the AN parameters included in the message 416 for later use when instantiating services. Those skilled in the art will appreciate that the CP set-up request message 416 may, in some embodiments, be at least one of an NG Setup Request message and a RAN Configuration Update Message. In one example, the NG Setup Request may include a Global RAN Node ID that identifies the type of AN node (such as LTE RAN node or 5G NR RAN node) and a globally unique AN node identifier. The globally unique AN node identifier may, in some embodiments, include a public land mobile network (PLMN) identifier and an AN node identifier that is unique within that PLMN. At least one of an NG Setup Request and RAN Configuration Update messages may also include the types of services supported by the AN node encoded, for example, as a list of supported service/slice types (SSTs) and/or supported service/slice differentiators (SDs). It will be well understood that different type of encoding of this data can also be used.

Figure 6:
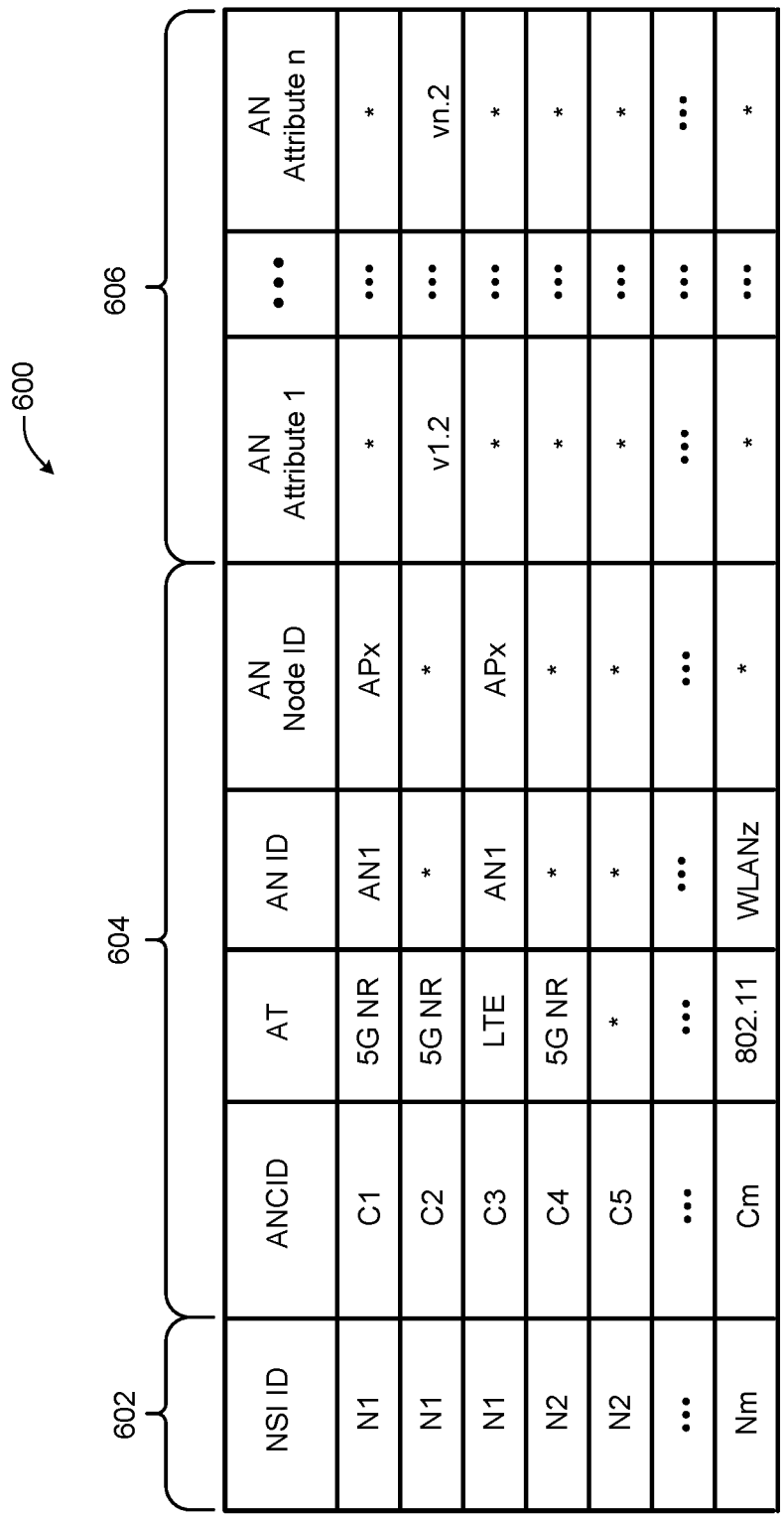
FIG. 6 illustrates an example configuration table in accordance with an embodiment of the present invention.

In some embodiments, the ANCID and NSI configuration information received in step 412 from the CMF 400 may be stored in an AN configuration table 600 of the form illustrated in FIG. 6. In the illustrated table 600, each row represents AN configuration information for a given network slice instance. Thus a first column of the table 600 contains the Network Slice Instance Identifier (NSI ID) 602, which may be defined by the CMF 400 as part of generating the network slice configuration. The next four columns of the table 600 contain AN configuration information 604 compiled by the CMF. Thus, continuing the example of FIG. 6, for the network service instance N1, the AN configuration information 604 contains the AT 510 and ANCID 512 of the AN configuration profile 500 and, optionally, the AN identifier and AN node identifier associated with the ANCID, reflecting information provided by the AN CPF in the CP set-up request message 416 during system initialization. Finally, the table 600 may include one or more optional columns 606 for additional AN attributes needed by the CN CPF 404 during instantiation of a service. These attributes may be used to refine the selection of an appropriate AN configuration, such as, for example: indoor vs. outdoor use cases; home/enterprise/carrier node use cases; macro cell vs. small cell use cases etc. The AN attributes 606 reflect information provided by the AN CPF in the CP set-up request message 416 during system initialization such as the list of supported SSTs and/or SDs.

It is contemplated that the CMF 400 will normally generate a respective set of AN configuration profiles 500 associated with the ATs supported by a specific AN, and each of these profiles 500 will be reflected in a corresponding row of the table 600. Thus FIG. 6 shows an example in which a single access network (AN1) has two AN configuration profiles, one for access technology "5G NR" and one for access technology "LTE" (corresponding to ANCIDs: C1 and C3), both of which (individually or together) are associated with a common Network Slice Instance ID (namely, N1).

However, it is also possible that a common AN configuration profile may be generated that pertains to multiple access networks. In this case, a single entry in the table 600 may be used to reference a configuration that is applicable to multiple access networks and/or to multiple AN nodes. This may be accomplished by inserting a wildcard character (such as a "*" character, for example) into one or more of the columns of table 600. For example, the wildcard character "*" in the AN ID and AN Node ID columns indicates that the ANCID may be used in association with the respective NSI ID in any access network and/or AN node.

Figure 7A:
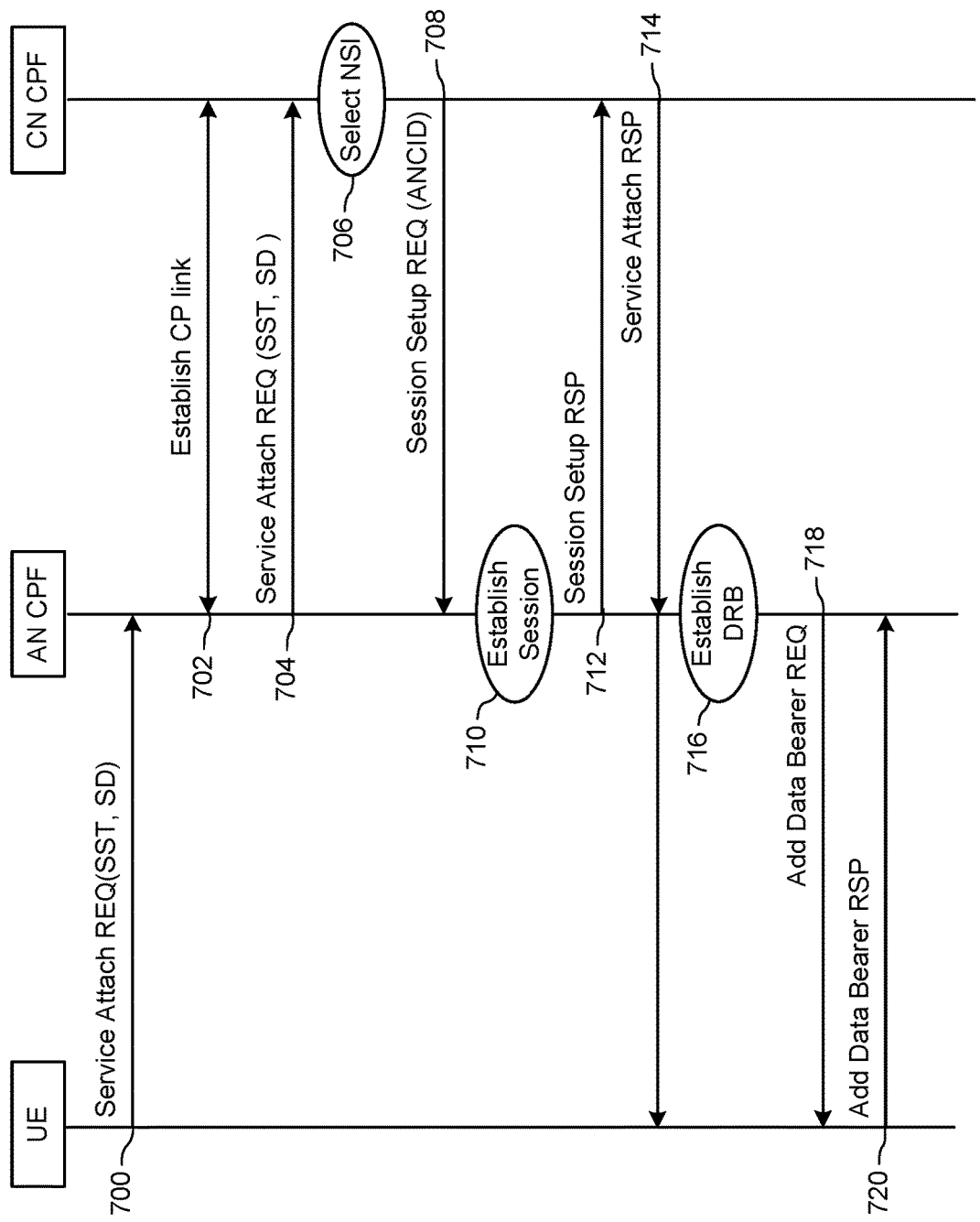
FIG. 7A illustrates an example message flow in accordance with an embodiment of the present invention.
Figure 7B:
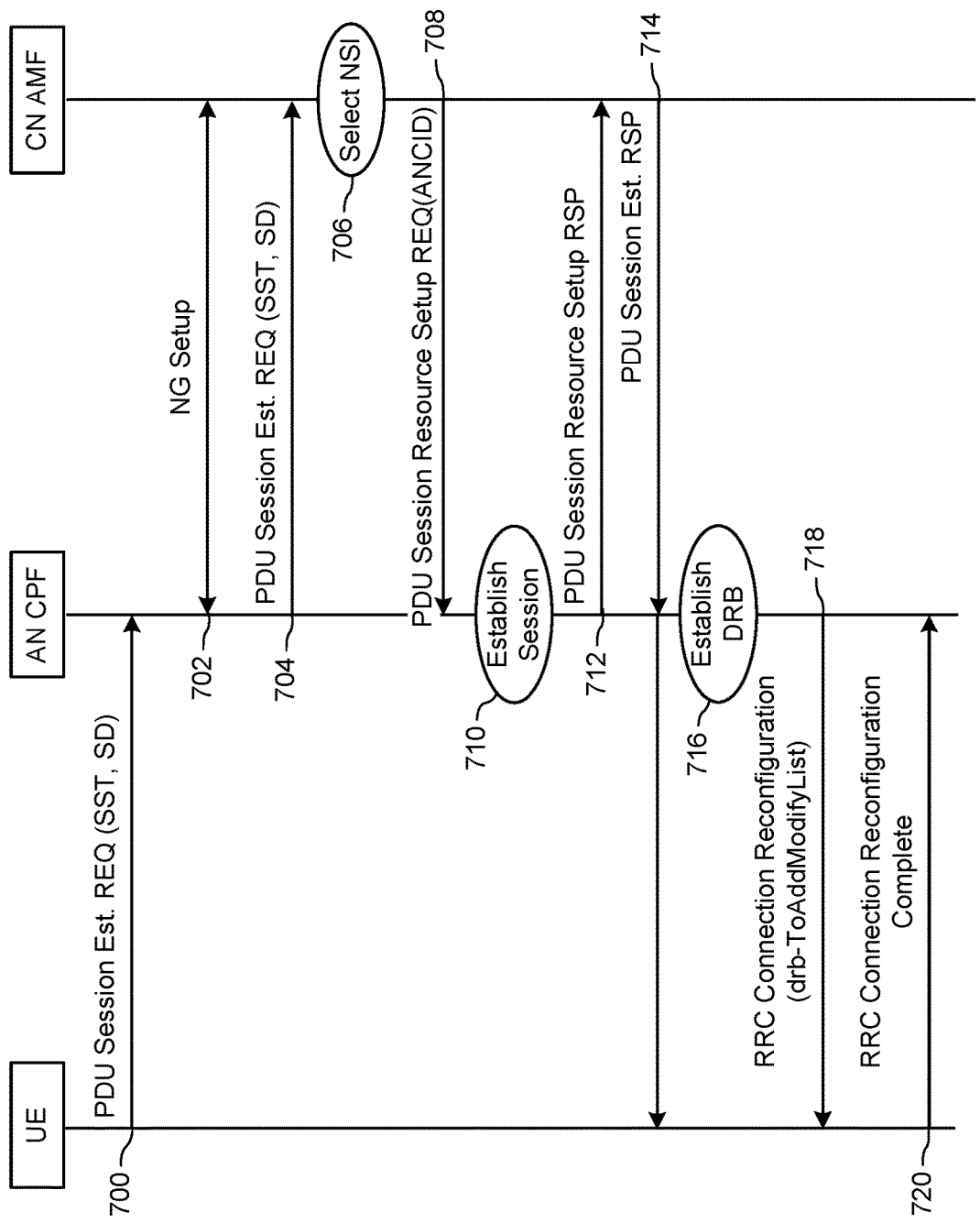
FIG. 7B illustrates an example message flow in accordance with another embodiment of the present invention.

FIG. 7A is a flow diagram illustrating an example process for processing a service request using the AN configuration profiles 500 and table 600 described above. FIG. 7B is a flow diagram illustrating the equivalent process for processing a PDU session establishment request using the AN configuration profiles 500 and table 600 described above.

Referring to FIG. 7A, the example process begins when a UE 208 sends a Service Attachment Request message (at step 700) to request a communication service. The Service Attach Request message includes information defining a requested service/slice type (SST) and a service/slice differentiator (SSD, and also referred to herein as SD). The AN CPF establishes a control plane link (at 702) with the CN CPF, if necessary, and forwards (at 704) the Service Attachment Request message to the CN-CPF, along with information identifying the UE. The establishment of CP link in 702 may be obviated by the use of an earlier established link. The CN CPF can use the received SST and SD information in combination with other information (such as the subscriber profile associated with the UE, the location of the UE, the network topology etc.) available to the CN CPF to select (at 706) an NSI to provide the requested service to the UE In some contexts, the Service Attachment Request message (at 700) may be referred to as a PDU Session Establishment Request message, as may be seen in FIG. 7B.

Based on the Service Attachment Request message received from the AN-CPF, the CN CPF uses the AN Configuration Table 600 to select the appropriate AN configuration(s) for the selected NSI. In some embodiments, this selection may be a "best fit" using the selected NSI ID and the AN ID and AN AT. It should be understood that as noted above, the discussion here of selecting an AN configuration may also be understood to be identification of an appropriate AN configuration (or configurations) for the selected NDI.

For example, if the AN ID of the requesting AN CPF is "AN1" and the selected NSI ID is "N1", then both of configurations C1 and C3 are acceptable, and so may be selected by the CN CPF. On the other hand, if the selected NSI ID was "N2", then the CN CPF could select configuration C4, provided that AN1 can support the AT of "5G NR". If the AN1 cannot support the AT of "5G NR", then the CN CPF may select configuration C5 as a default configuration that is applicable to all access networks and access technologies (as indicated by the wildcard character in both of these columns for configuration C5). As noted above, the selection may be an identification in some embodiments.

Following selection (or reselection) of the AN configuration, the CN CPF sends (at 708) a Session Setup Request to the AN CPF that includes UE-specific session configuration information, and the ANCID(s) identifying the AN configuration(s) (or acceptable AN configurations) for the selected NSI. In some embodiments, the CN CPF may be provided with the actual AN configuration(s) by the CMF, and the AN configuration(s) (rather than just the ANCID(s)) may be provided by the CN CPF to the AN CPF. In response to the Session Setup Request, the AN CPF establishes (at 710) a new session associated with the requested service.

In some contexts, the Session Setup Request may be referred to as a PDU Session Resource Setup Request, as may be seen in FIG. 7B, and the AN configuration(s) may be provided by the CN CPF to the AN CPF using a PDU Session Setup Request Transfer information element. In some contexts, the CN CPF may be a CN Access and Mobility Management Function (AMF) or a CN Session Management Function (SMF) as may be seen in FIG. 7B.

In a case in which the Session Setup Request (i.e. PDU Session Resource Setup Request) includes two or more ANCIDs (or AN configurations), the AN CPF may select one according to any suitable criteria, and establish the new PDU session using the selected AN configuration profile. An example criteria for selecting an ANCID (or AN configuration) to use for establishing the new PDU session includes the available resources that can be allocated to a PDU session using the identified configuration profiles and the access technology used in the access network. Thus it will be appreciated that the AN CPF may use the PDU session configuration and AN configuration information received from the CN CPF to establish the PDU session, but retains control over that process, at least to the extent of choosing between two or more alternative AN configurations identified by the CN CPF.

The AN CPF may then send a Session Setup Response (at 712) to the CN CPF that includes success (or failure) of session admission control. The CN CPF then may send a Service Attachment Response (at 714) to the UE (via the AN CPF) that includes session configuration information. Using the session configuration information and the ANCID(s), which in some embodiments is contained in the Session Setup Request, the AN CPF may configure one or more DRBs (at 716) to be used between the AP 202 and the UE 208 in accordance with the AN configuration profile indicated by the CN CPF (in 708) to carry the subscriber traffic associated with the service. In a case in which the Session Setup Request includes two or more ANCIDs (or AN configurations), the AN CPF may select one according to any suitable criteria, and establish the DRB(s) in accordance with the selected AN configuration profile. An example criteria for selecting an ANCID (or AN configuration) to use for establishing the DRB includes the available resources that can be allocated to a DRB using the identified configuration profiles and the access technology used in the AP currently serving the UE. Thus it will be appreciated that the AN CPF may use the session configuration and AN configuration information received from the CN CPF to configure DRBs between the AP 202 and the UE 208, but retains control over that configuration process, at least to the extent of choosing between two or more alternative AN configurations identified by the CN CPF.

In some contexts, the Session Setup Response (at 712) may be referred to as a PDU Session Resource Setup Response, as may be seen in FIG. 7B. Similarly, in some contexts, the Service Attachment Response (at 714) may be referred to as a PDU Session Establishment Response, as may be seen in FIG. 7B.

Once the configuration of the DRB has been determined, the AN CPF may send (at 718) an Add Data Bearer Request to the UE containing the configuration of the DRB(s). The UE may then send an Add Data Bearer Response to the AN CPF (at 720) to complete the service (PDU) session setup process. In some contexts, the Add Data Bearer Request (at 718) may be a Radio Resource Control (RRC) Connection Reconfiguration message as may be seen in FIG. 7B.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A configuration management function comprising:
   at least one processor;
   a non-transitory computer readable storage medium including software instructions configured to control the at least one processor to implement steps of:
   forwarding, to an access network function (ANF), at least one access network (AN) configuration profile, each AN configuration profile including parameters defining a respective configuration of access network resources and protocols corresponding to a network slice instance; and forwarding, to a core network function (CNF), information identifying each AN configuration profile for use by the CNF to:

identify one or more AN configuration profiles associated with a network slice instance selected from a plurality of network slice instances; and forward to the ANF information comprising a protocol data unit (PDU) session resource setup indication including a respective AN configuration identifier (ANCID) for each of the identified AN configuration profiles.

2. The configuration management function as claimed in claim 1, wherein the information forwarded to the ANF further comprises a network slice identifier (NSID) associated with the selected network slice instance.

3. A core network function comprising:

at least one processor;

a non-transitory computer readable storage medium including software instructions configured to control the at least one processor to implement steps of:

receiving information identifying, for each one of a plurality of network slice instances, at least one respective access network (AN) configuration profile of an access network;

identifying one or more of the AN configuration profiles associated with a network slice instance selected from the plurality of network slice instances; and forwarding, to an access network function, information comprising a protocol data unit (PDU) session resource setup indication including a respective AN configuration identifier (ANCID) for each of the identified one or more AN configuration profiles.

4. The core network function as claimed in claim 3, wherein the core network function comprises any one or more of a gateway and a server of the core network.

5. The core network function as claimed in claim 3, wherein identifying one or more of the AN configuration profiles comprises:

receiving, from the access network function, information identifying one or more attributes of the access network; and identifying, based on the received information identifying one or more attributes of the access network, AN configurations that are appropriate for a particular network slice instance.

6. A method comprising:

a core network function receiving information identifying, for each one of a plurality of network slice instances, at least one respective access network (AN) configuration profile of an access network;

the core network function identifying one or more of the AN configuration profiles associated with a network slice instance selected from the plurality of network slice instances; and the core network function forwarding, to an access network function, information comprising a protocol data unit (PDU) session resource setup indication including a respective AN configuration identifier (ANCID) for each of the identified one or more AN configuration profiles.

7. The method as claimed in claim 6, wherein the core network function comprises any one or more of a gateway and a server of the core network.

8. The method as claimed in claim 6, wherein identifying one or more of the AN configuration profiles comprises:

receiving, from the access network function, information identifying one or more attributes of the access network; and identifying, based on the received information identifying one or more attributes of the access network, AN configurations that are appropriate for a particular network slice instance.

\* \* \* \* \*

UNITED STATES PATENT AND TRADEMARK OFFICE
CERTIFICATE OF CORRECTION

PATENT NO.       : 10,771,325 B2
APPLICATION NO.  : 15/861177
DATED            : September 8, 2020
INVENTOR(S)      : Farmanbar et al.

Page 1 of 1

It is certified that error appears in the above-identified patent and that said Letters Patent is hereby corrected as shown below:

In the Specification

Column 6, Line 55, "MS" should read --NIS--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*